United States Patent
Suzuki et al.

(10) Patent No.: US 10,214,667 B2
(45) Date of Patent: Feb. 26, 2019

(54) ADHESIVE TAPE FOR PREVENTING ADHESION OF AQUATIC ORGANISMS

(71) Applicant: NITTO DENKO CORPORATION, Osaka (JP)

(72) Inventors: Satoru Suzuki, Osaka (JP); Tomonari Naito, Osaka (JP); Tsuyoshi Hiramatsu, Osaka (JP); Ryoko Asai, Osaka (JP); Naoki Kurata, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/564,107

(22) PCT Filed: Apr. 5, 2016

(86) PCT No.: PCT/JP2016/061136
§ 371 (c)(1),
(2) Date: Oct. 3, 2017

(87) PCT Pub. No.: WO2016/163360
PCT Pub. Date: Oct. 13, 2016

(65) Prior Publication Data
US 2018/0079934 A1  Mar. 22, 2018

(30) Foreign Application Priority Data
Apr. 8, 2015 (JP) ................. 2015-078931

(51) Int. Cl.
| | | |
|---|---|---|
| *B32B 27/00* | (2006.01) | |
| *C09J 133/08* | (2006.01) | |
| *C09J 201/00* | (2006.01) | |
| *C09J 7/20* | (2018.01) | |
| *C09J 7/02* | (2006.01) | |

(52) U.S. Cl.
CPC ............ *C09J 133/08* (2013.01); *B32B 27/00* (2013.01); *C09J 7/0275* (2013.01); *C09J 7/20* (2018.01); *C09J 201/00* (2013.01); *C09J 2423/046* (2013.01); *C09J 2433/00* (2013.01)

(58) Field of Classification Search
None
See application file for complete search history.

(56) References Cited

U.S. PATENT DOCUMENTS

| 4,814,227 A | 3/1989 | Maeda et al. | |
| 5,218,059 A * | 6/1993 | Kishihara | C09D 5/1675 525/477 |
| 6,300,283 B1 * | 10/2001 | Sakuta | A01N 25/30 504/362 |
| 7,638,165 B2 | 12/2009 | Jensen Moller | |
| 2004/0241433 A1 * | 12/2004 | Howard | B29C 63/0013 428/343 |
| 2006/0040061 A1 | 2/2006 | Jensen Moller | |
| 2014/0377552 A1 * | 12/2014 | Kurata | C09D 5/1675 428/354 |
| 2015/0079345 A1 * | 3/2015 | Kurata | C09J 7/29 428/141 |
| 2015/0218420 A1 * | 8/2015 | Hara | C09D 5/16 156/60 |
| 2016/0122593 A1 * | 5/2016 | Kurata | B32B 27/06 428/354 |

FOREIGN PATENT DOCUMENTS

| EP | 2 474 573 | 7/2012 | |
| EP | 2474573 A1 * | 7/2012 | ............. C08L 83/04 |
| JP | 46-026798 | 8/1971 | |
| JP | S61-126002 | 6/1986 | |
| JP | S63-62487 | 12/1988 | |
| JP | H01-054397 | 11/1989 | |
| JP | H04-142373 | 5/1992 | |
| JP | H08-127718 | 5/1996 | |
| JP | 3000101 | 1/2000 | |
| JP | 2002-069246 | 3/2002 | |
| JP | 2012-131898 | 7/2012 | |
| JP | WO 2013103092 A1 * | 7/2013 | ............. B63B 59/04 |
| JP | 2015-028153 | 2/2015 | |
| WO | 2004/011563 A2 | 2/2004 | |
| WO | WO-2013000477 A1 * | 1/2013 | ........... C09D 5/1675 |

(Continued)

OTHER PUBLICATIONS

Definition "Ionomer", Merriam Webster dictionary, retrived on Feb. 4, 2018.*
"Silicone Rubber—Chemical Crosslinking Principle", Wacher Chemical AG, retrived on Feb. 4, 2018.*
Shintaro, inazawa, "Underwater Antifouling Multilayer Laminate", English translation of JP 61126002A, publication date Jun. 13, 1986 (Year: 1986).*
Toshiyuki, Takezawa et al. "Antifouling Coating Composition, Antifouling Coating Film Formed by Using the Coating Composition, Underwater Structure Having the Coating Film on Surface, and Antifouling Treatment Methold for Forming the COating Film", English translation of JP 2009-215527A (Year: 2009).*

(Continued)

*Primary Examiner* — Anish P Desai
(74) *Attorney, Agent, or Firm* — Hauptman Ham, LLP

(57) ABSTRACT

The present invention provides a pressure-sensitive adhesive tape for preventing adhesion of aquatic organisms, which includes an antifouling layer, a base material layer and a pressure-sensitive adhesive layer in this order, which has the base material layer composed of an inexpensive material, and which has high adhesion between the antifouling layer and the base material layer without performing the easy adhesion treatment, for example, a primer treatment or a corona treatment. A pressure-sensitive adhesive tape for preventing adhesion of aquatic organisms of the present invention comprises an antifouling layer, a base material layer and a pressure-sensitive adhesive layer in this order, wherein the base material layer contains an ionomer resin.

8 Claims, 1 Drawing Sheet

(56) References Cited

FOREIGN PATENT DOCUMENTS

WO      2014/208594 A1      12/2014

OTHER PUBLICATIONS

Reactive & Non-Reactive Modified Silicone Fluid, ShinEtsu (Year: 2016).*
Yoshito Nakai, "Antifouling Coating Material", English translation JP04142373A (Year: 1992).*
Kurata, Naoki et al., "Adhesive Tape for Preventing Aquatic Biofouling", machine translation JP2015-02813A (Year: 2015).*
Katsumi, Amidaichi et al., "Room Temperature Curable Organopolysiloxane Composition and Cured Material Prepared Therefrom", English translation of JP 08-127718 A, published May 21, 1996. (Year: 1996).*
Decision to Grant a Patent dated Aug. 29, 2017, which issued during prosecution of Japanese Application No. 2017-510990.
International Search Report dated Jun. 14, 2016, which issued during prosecution of International Application No. PCT/JP2016/061136.
Notification of Reasons for Refusal dated May 9, 2017, which issued during prosecution of Japanese Application No. 2017-510990.
Singapore Office Action dated May 22, 2018 in the corresponding Singapore Patent Application No. 11201708174P.
The extended European search report dated Oct. 16, 2018 for corresponding European Application No. 16776526.2, citing the above references.

* cited by examiner

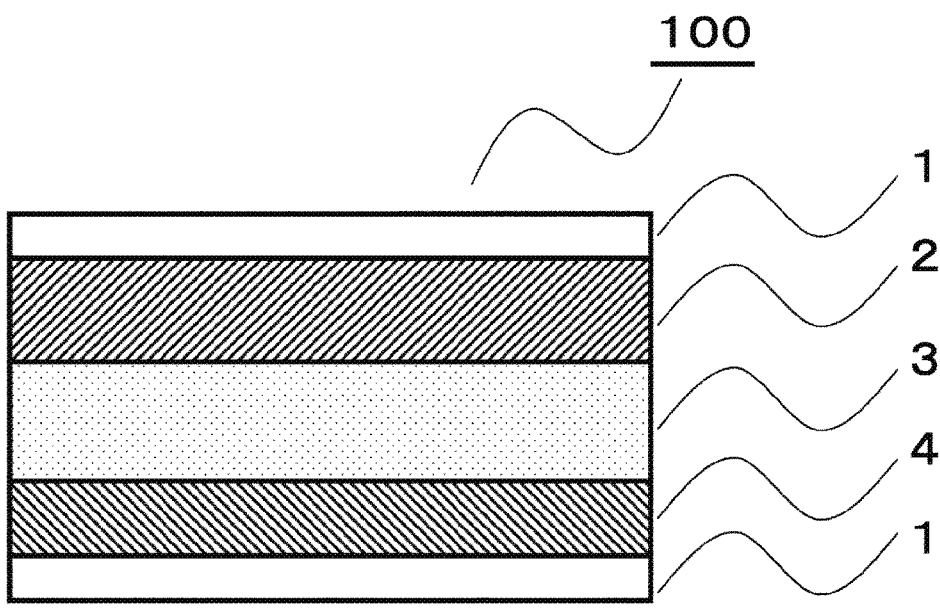

ADHESIVE TAPE FOR PREVENTING ADHESION OF AQUATIC ORGANISMS

RELATED APPLICATIONS AND INCORPORATION BY REFERENCE

The present patent application is filed pursuant to 35 U.S.C. § 371 as a U.S. National Phase Application of International Patent Application No. PCT/JP2016/061136 filed Apr. 5, 2016, claiming the benefit of priority to Japanese Patent Application No. 2015-078931 filed Apr. 8, 2015. The International Application was published as WO 2016/163360 on Oct. 13, 2016. The contents of each of the aforementioned patent applications are herein incorporated by reference in their entirety.

TECHNICAL FIELD

The present invention relates to a pressure-sensitive adhesive tape for preventing adhesion of aquatic organisms. More specifically, the invention relates to a pressure-sensitive adhesive tape for preventing adhesion of aquatic organisms for preventing aquatic organisms from adhering to an underwater structure (for example, a ship, a buoy, a harbor facility, a maritime oil field facility, a waterway for power plant cooling water, a waterway for factory cooling water or a water floating passage) to proliferate.

BACKGROUND ART

A marine organism, for example, a barnacle, an oyster, a blue mussel, a hydra, a serpula, a sea squirt, a moss animal, a sea lettuce, a green layer or an attached diatom adheres to a portion of an underwater structure, for example, a ship in contact with seawater to proliferate, thereby causing an unfavorable state, for example, a reduction in facility mechanical performance, e.g., an increase in fluid resistance or a reduction in thermal conductivity, or diffusion of the adhering marine organism to overseas. In addition, an operation of removing the adhering marine organism requires a great deal of labor and an enormous amount of time, which results in economic loss.

In order to prevent the damage as described above, hitherto, the underwater structure is painted with an antifouling paint. The antifouling paint contains a toxic antifouling agent, which, for example, was formerly an organotin compound and is currently cuprous oxide. Although adhesion and growth of the marine organism can be suppressed almost completely by the toxicity of the antifouling paint, the toxic antifouling agent, for example, the organotin compound or cuprous oxide causes a serious problem in the long run because the agent adversely affects a human body or an environment to no small extent. In addition, when the antifouling paint is dried after its painting, about 30% by weight of an organic solvent (VOC) volatilizes to adversely affect a work environment or a surrounding environment. In spray-type painting, in addition to discharge of the VOC to the atmosphere, from 10% to 20% by weight of the paint is said to be scattered to the surroundings by the wind. On the other hand, when the structure painted with the antifouling paint that has been used for many years is repainted with a new one, the antifouling paint that has become old is peeled with a sandblast or a metal grinder. At that time, however, a large amount of coating film pieces each containing the toxic antifouling agent, for example, the organotin compound or cuprous oxide are scattered to the surroundings to adversely affect an operator or the environment. In addition, the antifouling paint peeled is treated as industrial waste. Accordingly, the paint has been causing a major problem.

As described above, the conventional antifouling paint has an inhibiting effect on the adhesion of marine organisms, but adversely affects the human body or the environment to a large extent, which still has many unsolved problems to the present date.

Accordingly, there has been proposed a pressure-sensitive adhesive tape formed by bonding a copper foil and a pressure-sensitive adhesive to each other through a primer (see Patent Documents 1 and 2). However, since the suppression of the adhesion of marine organisms in the pressure-sensitive adhesive tape is attained by a copper component in the copper foil, there is a problem in that the tape may adversely affect the environment. In addition, the peel adhesive strength for an FRP plate of the pressure-sensitive adhesive tape is designed to be extremely large, specifically, 2.6 kg/25 mm or 7.5 kg/25 mm (after primer pretreatment). Thus, it is difficult to consider that the pressure-sensitive adhesive tape after use can be easily peeled by human power when the pressure-sensitive adhesive tape is replaced with another tape. Ultimately, a great deal of labor is needed because an action, for example, scraping is needed. In addition, since copper has a specific weight of 8.94 g/cm$^3$, which is a heavy substance, the use of copper for a movable structure, for example, a ship deteriorates fuel efficiency and is not preferred from an economic viewpoint.

In addition, there has been proposed an antifouling tape composed of two layers, i.e., a silicone rubber layer and a pressure-sensitive adhesive layer (see Patent Document 3). However, the silicone rubber layer responsible for an antifouling effect does not contain an antifouling agent, for example, an oil, and hence is the silicone rubber itself. In the case where the antifouling agent is not contained, the adhesion of marine organisms can be suppressed by the water-repellent property of the silicone rubber for a short period of time, but the antifouling effect is not sustained for a long period of time. In addition, extreme concern is raised about the strength of the antifouling tape because the tape is composed of two layers, i.e., a silicone rubber and a pressure-sensitive adhesive. In general, the silicone rubber has an extremely low strength at break and thus, the case where the antifouling tape is peeled after use is not realistic because it is difficult to peel the tape while maintaining its tape form.

Therefore, in order to increase the strength, it is conceivable to provide a base material layer.

For example, there has been proposed a sheet-shaped tape including a silicone elastomer provided on a base material layer through an undercoating agent and a pressure-sensitive adhesive layer provided on the opposite side of the base material layer (see Patent Document 4). The sheet-shaped tape disclosed in Patent Document 4 contains a fluorine-containing liquid compound and/or a hydrophobic silicone-based liquid compound as an antifouling agent. However, the sheet-shaped tape containing the antifouling agent cannot express sufficient antifouling performance. In addition, in Patent Document 4, since there is no description at all about the composition of a pressure-sensitive adhesive usable in water or about the adhesive strength of the tape, the application of the tape to a pressure-sensitive adhesive tape for preventing adhesion of aquatic organisms lacks reality. In addition, in the application of an antifouling tape to an underwater structure, the flexibility and elongation property of the tape need to be designed such that the tape can be applied to a curved surface or an acute angle surface. In addition, the strength of the tape needs to be designed such that the base material layer is prevented from breaking during the peeling of the antifouling tape after use. However, in Patent Document 4, since there is no description at all about these properties, the application of the tape to a pressure-sensitive adhesive tape for preventing adhesion of aquatic organisms lacks reality.

In the case of considering a base material layer as a component of the pressure-sensitive adhesive tape for preventing adhesion of aquatic organisms, cost reduction of the base material itself is one of the big issues. As a material for inexpensive base material (approximately 100 yen/m$^2$ or less), vinyl chloride, polyethylene or the like is exemplified. However, when a conventional silicone-based antifouling layer is provided on a base material layer composed of such a material, since a problem in that the antifouling layer is peeled off from the base material layer arises, it is necessary to increase adhesion between the base material layer and the antifouling layer.

As a technical means for improving the adhesion between the base material layer and the antifouling layer, an easy adhesion treatment, for example, a primer treatment or a corona treatment to a surface of the base material layer is exemplified. However, when the easy adhesion treatment is performed, there is a problem in that the manufacturing process of the pressure-sensitive adhesive tape for preventing adhesion of aquatic organisms increases.

PRIOR ART DOCUMENT

Patent Document

Patent Document 1: JP-B-S63-62487
Patent Document 2: JP-B-H1-54397
Patent Document 3: Japanese Patent No. 3,000,101
Patent Document 4: JP-A-2002-69246

SUMMARY OF THE INVENTION

Problems that the Invention is to Solve

An object of the present invention is to provide a pressure-sensitive adhesive tape for preventing adhesion of aquatic organisms, which includes an antifouling layer, a base material layer and a pressure-sensitive adhesive layer in this order, which has the base material layer composed of an inexpensive material, and which has high adhesion between the antifouling layer and the base material layer without performing an easy adhesion treatment, for example, a primer treatment or a corona treatment.

Means for Solving the Problems

A pressure-sensitive adhesive tape for preventing adhesion of aquatic organisms according to the invention is a pressure-sensitive adhesive tape for preventing adhesion of aquatic organisms including an antifouling layer, a base material layer and a pressure-sensitive adhesive layer in this order, wherein the base material layer contains an ionomer resin.

In a preferred embodiment, the antifouling layer contains a silicone resin.

In a preferred embodiment, the antifouling layer further contains a silicone oil.

In a preferred embodiment, the silicone oil includes a polyether-modified silicone oil.

In a preferred embodiment, the pressure-sensitive adhesive layer has a 180° peel adhesive strength of 30 N/20 mm or less at 23° C. and at a tensile speed of 300 mm/min.

Advantage of the Invention

According to the invention, a pressure-sensitive adhesive tape for preventing adhesion of aquatic organisms, which includes an antifouling layer, a base material layer and a pressure-sensitive adhesive layer in this order, which has the base material layer composed of an inexpensive material, and which has high adhesion between the antifouling layer and the base material layer without performing an easy adhesion treatment, for example, a primer treatment or a corona treatment can be provided.

BRIEF DESCRIPTION OF THE DRAWINGS

FIG. 1 is a schematic sectional view of an example of the pressure-sensitive adhesive tape for preventing adhesion of aquatic organisms of the invention.

MODE FOR CARRYING OUT THE INVENTION

The pressure-sensitive adhesive tape for preventing adhesion of aquatic organisms of the invention includes an antifouling layer, a base material layer and a pressure-sensitive adhesive layer in this order.

The pressure-sensitive adhesive tape for preventing adhesion of aquatic organisms of the invention may include any appropriate other layer to the extent that the effect of the invention is not impaired as long as the tape includes the antifouling layer, the base material layer and the pressure-sensitive adhesive layer in this order.

The thickness of the pressure-sensitive adhesive tape for preventing adhesion of aquatic organisms of the invention is set to any appropriate thickness depending on the thickness of each layer in the tape to the extent that the effect of the invention is not impaired. The thickness of the pressure-sensitive adhesive tape for preventing adhesion of aquatic organisms of the invention is preferably from 50 μm to 5,000 μm.

FIG. 1 is an illustration of a schematic sectional view of an example of the pressure-sensitive adhesive tape for preventing adhesion of aquatic organisms of the invention. A pressure-sensitive adhesive tape 100 for preventing adhesion of aquatic organisms of the invention includes an antifouling layer 2, a base material layer 3 and a pressure-sensitive adhesive layer 4 in this order. As illustrated in FIG. 1, the surface of the antifouling layer 2 or the surface of the pressure-sensitive adhesive layer 4 may be provided with a release film 1.

The base material layer contains an ionomer resin. The content of the ionomer resin in the base material layer is preferably from 50% by weight to 100% by weight, more preferably from 70% by weight to 100% by weight, still more preferably from 80% by weight to 100% by weight, yet still more preferably from 90% by weight to 100% by weight, even yet still more preferably from 95% by weight to 100% by weight, particularly preferably from 98% by weight to 100% by weight, and most preferably substantially 100% by weight. When the content of the ionomer resin in the base material layer is set to the range described above, a base material layer composed of an inexpensive material can be formed and the adhesion between the antifouling layer and the base material layer can be increased without performing the easy adhesion treatment, for example, a primer treatment or a corona treatment. The base material layer may contain a resin other than the ionomer resin, and examples of the other resin include a curable resin (for example, a phenol resin or an unsaturated polyester resin), a thermoplastic resin (for example, polyolefin, e.g., polyethylene or polypropylene, an ABS resin or polyvinyl chloride), and a thermoplastic elastomer (for example, a styrene-based, an olefin-based or a urethane-based).

Any appropriate ionomer resin may be adopted as the ionomer resin to the extent that the effect of the invention is not impaired. The ionomer resin may be used only one kind or may be used two or more kinds.

The ionomer resin is an ionic polymer including a hydrophobic polymer main chain and partially, a small amount of ionic group of a metal salt or an ammonium salt of a carboxylic acid, a sulfonic acid or the like as a side chain, and is a resin having an ionic crosslinking in the molecule.

The ionomer resin includes, for example, a copolymer composed of an α-olefin, for example, ethylene or propylene, a polymerizable monomer having an anionic group and optionally other polar monomer, in which the anionic group is crosslinked with a cation of a metal ion (for example, a sodium ion, a potassium ion, a magnesium ion or a zinc ion).

The polymerizable monomer having an anionic group includes, for example, acrylic acid, methacrylic acid, fumaric acid, maleic acid, maleic anhydride, monomethyl maleate and monoethyl maleate.

The other polar monomer includes, for example, a vinyl ester, e.g., vinyl acetate or vinyl propionate; an unsaturated carboxylic acid ester, e.g., methyl acrylate, ethyl acrylate, isopropyl acrylate, n-butyl acrylate, isobutyl acrylate, n-hexyl acrylate, isooctyl acrylate, methyl methacrylate, dimethyl maleate or diethyl maleate; and carbon monoxide.

The metal ion includes, for example, a metal ion having a monovalent, divalent or trivalent valence, in particular, a metal ion having a monovalent to trivalent valence of the group IA, IIA, IIIA, IVA or VIII in the periodic table. Specific examples of the metal ion include $Na^+$, $K^+$, $Li^+$, $Cs^+$, $Ag^+$, $Hg^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Sn^{++}$, $Pb^{++}$, $Fe^{++}$, $Co^{++}$, $Ni^{++}$, $Zn^{++}$, $Al^{++}$, $Sc^{+++}$, $Fe^{+++}$ and $Y^{+++}$.

Specific examples of the ionomer resin include an ethylene-methacrylic acid copolymer ionomer, an ethylene-acrylic acid copolymer ionomer, a propylene-methacrylic acid copolymer ionomer, a propylene-acrylic acid copolymer ionomer and a butylene-acrylic acid copolymer ionomer.

The ionomer resin includes, for example, Himilan 1554, Himilan 1555, Himilan 1557, Himilan 1601, Himilan 1605, Himilan 1650, Himilan 1706, Himilan 1707, Himilan 1855, Himilan 1856 and the like produced by Dupont-Mitsui Polychemicals Co., Ltd., Surlyn and the like produced by Du Pont, and ETFE ionomer, which is a fluorine-based ionomer, and the like produced by Daikin Industries, Ltd.

The base material layer preferably has an elongation of 100% or more, more preferably 120% or more, and still more preferably 150% or more. When the elongation of the base material layer is 100% or more, the pressure-sensitive adhesive tape for preventing adhesion of aquatic organisms of the invention can satisfactorily follow the shapes of various adherends. The tape can be satisfactorily bonded onto a flat surface, and can also be satisfactorily bonded, for example, onto a curved surface portion, a 90°-angle portion or an acute angle portion which are found on the surface of a ship's hull. When the elongation of the base material layer is less than 100%, the tape cannot sufficiently follow the shapes of various adherends, and hence wrinkles and non-adhesion portions of an adhesive occur, which is liable to cause poor external appearance and poor adhesion. The upper limit of the elongation of the base material layer is preferably 2,000% or less from the viewpoint of the strength of the base material layer.

The base material layer has a stress at break of preferably 10 MPa or more, more preferably 12 MPa or more, and still more preferably 15 MPa or more. When the stress at break of the base material layer falls within the range described above, the base material layer can be suppressed from being cut upon peeling of the pressure-sensitive adhesive tape for preventing adhesion of aquatic organisms of the invention which has already been used from the adherend. When the stress at break of the base material layer is less than 10 MPa, the base material layer is frequently cut upon peeling of the pressure-sensitive adhesive tape for preventing adhesion of aquatic organisms of the invention which has already been used from the adherend, and hence working efficiency is liable to remarkably deteriorate. The upper limit of the stress at break of the base material layer is preferably 200 MPa or less from the viewpoint of the handleability of the base material layer.

The base material layer has an elastic modulus of preferably 4,000 MPa or less, more preferably 1,000 MPa or less, still more preferably 100 MPa or less, and particularly preferably 50 MPa or less. When the elastic modulus of the base material layer is 4,000 MPa or less, the pressure-sensitive adhesive tape for preventing adhesion of aquatic organisms of the invention can satisfactorily follow the shapes of various adherends, which leads to an improvement in applicability. The lower limit of the elastic modulus of the base material layer is preferably 0.1 MPa or more from the viewpoint of the handleability of the base material layer.

The base material layer may contain any appropriate additive to the extent that the effect of the invention is not impaired. Examples of the additive include an olefin-based resin, a silicone-based polymer, a liquid acrylic copolymer, a tackifier, an anti-aging agent, a hindered amine-based light stabilizer, an ultraviolet absorbing agent, an antioxidizing agent, an antistatic agent, polyethylene imine, a fatty acid amide, a fatty acid ester, a phosphoric acid ester, a lubricant, a surfactant, a filler and a pigment (for example, calcium oxide, magnesium oxide, silica, zinc oxide, titanium oxide or carbon black).

The base material layer preferably contains an ultraviolet absorbing agent. When the base material layer contains the ultraviolet absorbing agent, the weatherability of the pressure-sensitive adhesive tape for preventing adhesion of aquatic organisms of the invention is improved. When the base material layer does not contain any ultraviolet absorbing agent, the base material is likely deteriorated owing to sunlight in outdoor use and hence it is liable to become difficult to maintain the original base material strength. In addition, when the base material is deteriorated, the base material layer is frequently cut upon peeling of the pressure-sensitive adhesive tape for preventing adhesion of aquatic organisms of the invention which has already been used from an adherend and hence working efficiency is liable to remarkably deteriorate.

Any appropriate thickness may be adopted as the thickness of the base material layer depending on, for example, the applications and use environment of the pressure-sensitive adhesive tape for preventing adhesion of aquatic organisms of the invention. The thickness of the base material layer is preferably from 1 μm to 1,000 μm, more preferably from 10 μm to 800 μm, and still more preferably from 20 μm to 500 μm). When the thickness of the base material layer falls within the range described above, the pressure-sensitive adhesive tape for preventing adhesion of aquatic organisms of the invention can be easily bonded to a portion except a flat surface, for example, a curved surface or an acute angle surface, with good workability, and poor external appearance, for example, a wrinkle or floating hardly occurs in its surface after the bonding. When the thickness of the base material layer is too small, the handleability deteriorates and the layer cannot serve as the base material, which is liable to be impractical. When the thickness of the base material layer is too large, the layer cannot sufficiently follow the shape of an adherend, unevenness at a joint portion of the tape enlarges, and dirt is liable to adhere.

A silane coupling agent may be added to the base material layer in order to further improve its adhesion with the antifouling layer. When the antifouling layer contains a silicone resin, a silanol group or an alkoxysilane group, which reacts with the silicone resin, can be introduced into the base material layer by the silane coupling agent to improve the adhesion.

The silane coupling agent may be used only one kind or may be used two or more kinds. Specific examples of the silane coupling agent, which is commercially available, include KBM5103, KBM1003, KBM903, KBM403 and KBM802 produced by Shin-Etsu Chemical Co., Ltd.

When the base material layer contains the silane coupling agent, the content of the silane coupling agent in the base material layer is preferably from 0.01% by weight to 10% by weight. When the content of the silane coupling agent in the base material layer falls within the range described above, the base material layer can be suppressed from being excessively hardened and also the adhesion between the base material layer and the antifouling layer is further increased.

The antifouling layer preferably contains a silicone resin.

Any appropriate content may be adopted as the content of the silicone resin in the antifouling layer depending on the content of any other component, for example, an antifouling agent. The content of the silicone resin in the antifouling layer is preferably from 30% by weight to 98% by weight, more preferably from 40% by weight to 97% by weight, still more preferably 45% by weight to 96% by weight, and particularly preferably from 50% by weight to 95% by weight. When the content of the silicone resin in the antifouling layer falls within the range described above, the antifouling layer can express its antifouling effect and mechanical characteristics more sufficiently. When the content of the silicone resin in the antifouling layer is too small, the mechanical characteristics of the antifouling layer is liable to be reduced. When the content of the silicone resin in the antifouling layer is too large, the antifouling layer is liable to be unable to express its antifouling effect sufficiently.

Any appropriate silicone resin may be adopted as the silicone resin to the extent that the effect of the invention is not impaired. The silicone resin may be used only one kind or may be used two or more kinds. The silicone resin may be a silicone resin which is liquid at normal temperature or may be a silicone resin which is solid at normal temperature. In addition, the silicone resin may be a condensation-type silicone resin or may be an addition-type silicone resin. In addition, the silicone resin may be a one-component silicone resin to be dried alone or may be a two-component silicone resin to be compounded with a curing agent.

In view of more expressing the effect of the invention, of those, a two-component silicone resin is preferred, and a two-component addition-type silicone resin is more preferred as the silicone resin in the invention. Examples of the two-component addition-type silicone resin include KE-1950-10(A/B), KE-1950-20(A/B), KE-1950-30(A/B), KE-1950-35(A/B), KE-1950-40(A/B), KE-1950-50(A/B), KE-1950-60(A/B), KE-1950-70(A/B), KE-1987(A/B) and KE-1988(A/B) produced by Shin-Etsu Chemical Co., Ltd., an LR7665 series and an LR3033 series produced by Wacker Asahikasei Silicone Co., Ltd., and a TSE3032 series produced by Momentive Performance Materials Inc.

In order to improve easy removability of aquatic organisms in the pressure-sensitive adhesive tape for preventing adhesion of aquatic organisms of the invention, the silicone resin is preferably a silicone resin having the property in that the surface of the resin undergoes elastic deformation, for example, by a water pressure at the time of the removal of the organism by water washing to facilitate the peeling of an adhering substance. The silicone resin has a 100% modulus (tensile stress) of preferably from 0.1 MPa to 10 MPa, more preferably from 0.1 MPa to 6 MPa. In addition, the silicone resin is preferably soluble in an organic solvent.

The antifouling layer preferably further contains a silicone oil. That is, the antifouling layer preferably contains a silicone resin and a silicone oil.

In the case where the antifouling layer contains a silicone resin and a silicone oil, the silicone oil migrates to the surface of the silicone resin as a matrix to coat the surface with an antifouling substance, and thereby can prevent the adhesion of aquatic organisms to the surface of the silicone resin and express an action of maintaining a high antifouling effect for a long period of time. Accordingly, the pressure-sensitive adhesive tape for preventing adhesion of aquatic organisms can be provided, which can maintain an antifouling effect over a long period of time, has a small load on a human body or an environment, has a light weight, can maintain stable quality, and can effectively prevent adhesion of aquatic organisms.

The content of the silicone oil with respect to 100 parts by weight of the silicone resin is preferably from 1 part by weight to 150 parts by weight, more preferably from 40 parts by weight to 140 parts by weight, still more preferably from 45 parts by weight to 130 parts by weight, yet still more preferably from 50 parts by weight to 120 parts by weight, even yet still more preferably more than 50 parts by weight and 110 parts by weight or less, particularly preferably from 60 parts by weight to 100 parts by weight, and most preferably from 70 parts by weight to 95 parts by weight. When the content of the silicone oil with respect to 100 parts by weight of the silicone resin is set to fall within the range described above, the antifouling layer can express the antifouling effect more sufficiently and can express the external appearance characteristics and mechanical characteristics more sufficiently. When the content of the silicone oil with respect to 100 parts by weight of the silicone resin is too small, the antifouling layer is liable to be unable to express its antifouling effect sufficiently. When the content of the silicone oil with respect to 100 parts by weight of the silicone resin is too large, the external appearance of a final molded article or coating film is liable to be poor, and the antifouling layer is liable to be reduced in strength to be unable to maintain its antifouling property.

The silicone oil preferably includes a polyether-modified silicone oil in the invention. The polyether-modified silicone oil may be used only one kind or may be used two or more kinds. When the silicone oil includes a polyether-modified silicone oil, the antifouling layer can express the antifouling effect more sufficiently and the adhesion of aquatic organisms, for example, algae can be more effectively prevented over a long period of time.

In the case where the silicone oil includes a polyether-modified silicone oil in the invention, the content of the polyether-modified silicone oil with respect to 100 parts by weight of the silicone resin is preferably from 0.01 part by weight to 50 parts by weight, more preferably from 0.05 parts by weight to 45 parts by weight, still more preferably from 0.1 part by weight to 40 parts by weight, yet still more preferably from 0.5 parts by weight to 35 parts by weight, particularly preferably from 0.7 parts by weight to 30 parts by weight, and most preferably from 1.0 part by weight to 25 parts by weight. When the content of the polyether-modified silicone oil with respect to 100 parts by weight of the silicone resin is set to fall within the range described above, the antifouling layer can express the antifouling effect more sufficiently, the adhesion of aquatic organisms, for example, algae can be more effectively prevented over a long period of time, and also the adhesion between the antifouling layer and the base material layer can be ensured more sufficiently.

In the invention, in particular, in order to express more sufficiently the antifouling effect of the antifouling layer and to prevent more effectively the adhesion of aquatic organisms, for example, algae over a long period of time, even when the content of the polyether-modified silicone oil with respect to 100 parts by weight of the silicone resin is increased (for example, preferably 5 parts by weight or less, more preferably 10 parts by weight or less, still more preferably 15 parts by weight or less, particularly preferably 20 parts by weight or less, most preferably 25 parts by weight or less), peeling off of the antifouling layer from the base material layer can be effectively prevented, because the base material layer contains an ionomer resin. On the other hand, in the case where the base material layer does not contain an ionomer resin, in order to express more sufficiently the antifouling effect of the antifouling layer and to prevent more effectively the adhesion of aquatic organisms, for example, algae over a long period of time, when the content of the polyether-modified silicone oil with respect to 100 parts by weight of the silicone resin is increased, the antifouling layer is liable to be peeled off from the base material layer.

The polyether-modified silicone oil in the invention has an HLB preferably from 3 to 15, and more preferably from 3 to 10. When the HLB of the polyether-modified silicone oil falls within the range described above, the antifouling layer can express the antifouling effect more sufficiently, the adhesion of aquatic organisms, for example, algae can be more effectively prevented over a long period of time, and also the antifouling layer can express the external appearance characteristics and mechanical characteristics more sufficiently. The HLB refers to a hydrophilic-lipophilic balance numerically indicated the balance between hydrophilicity and lipophilicity of oil, and is an abbreviation of a value of hydrophile and liophile balance. The HLB of the polyether-modified silicone oil can be controlled, for example, by selecting chain lengths of polyether polyoxy-alkylene chain (group) and dimethyl siloxane chain (group) or by selecting chain lengths of hydrophilic polyethylene oxide and more hydrophobic polypropylene oxide of the polyether polyoxyalkylene chain (group).

The polyether-modified silicone oil has a polysiloxane having a siloxane bond in the main chain and one or more polyoxyalkylene group as a substituent. The main chain may form a ring.

The bonding position of the polyoxyalkylene group in the polyether-modified silicone oil may be any appropriate bonding position. For example, the polyoxyalkylene groups may be bound at both terminals of the main chain, the polyoxyalkylene group may be bound at one terminal of the main chain, or the polyoxyalkylene group may be bound to a side chain.

In order to more sufficiently express the effect of the invention, a side chain type (straight-chain type) polyether-modified silicone oil in which a polyoxyalkylene group is bound to a side chain is preferably selected as the polyether-modified silicone oil.

The side chain type (straight-chain type) polyether-modified silicone oil is preferably represented by formula (1).

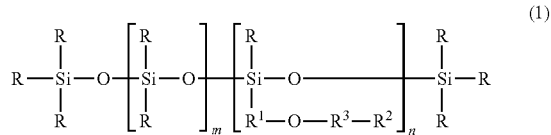

In formula (1), R each independently represents an alkyl group having from 1 to 3 carbon atoms, $R^1$ represents an alkylene group having from 1 to 4 carbon atoms, $R^2$ represents a hydrogen atom or an alkyl group having from 1 to 15 carbon atoms, $R^3$ is a polyoxyalkylene group represented by $-(C_2H_4O)_a-(C_3H_6O)_b-$, a is from 1 to 50, b is from 0 to 30, m is 1 to 7,000, and n is from 1 to 50.

In formula (1), R is preferably a methyl group.

The polyether-modified silicone oil includes, for example, a side chain type (straight-chain type) polyether-modified silicone oil, e.g., KF-6011 (HLB: 14.5), KF-6011P (HLB: 14.5), KF-6012 (HLB: 7.0), KF-6013 (HLB: 10.0), KF-6015 (HLB: 4.5), KF-6016 (HLB: 4.5), KF-6017 (HLB: 4.5), KF-6017P (HLB: 4.5), KF-6043 (HLB: 14.5), KF-6004 (HLB: 9.0), KF351A, KF352A, KF353, KF354L, KF355A, KF615A, KF945, KF-640, KF-642, KF-643, KF-644, KF-6020, KF-6204 or X-22-4515 (trade names) produced by Shin-Etsu Chemical Co., Ltd.; a side chain type (branched-chain type) polyether-modified silicone oil, e.g., KF-6028 (HLB: 4.0) or KF-6028P (HLB: 4.0) (trade names) produced by Shin-Etsu Chemical Co., Ltd.; and a side chain type (branched-chain type, alkyl co-modified type) polyether-modified silicone oil, e.g., KF-6038 (HLB: 3.0) (trade name) produced by Shin-Etsu Chemical Co., Ltd.

In the invention, the silicone oil may include a non-reactive silicone oil other than the polyether-modified silicone oil. The non-reactive silicone oil other than the polyether-modified silicone oil may be used only one kind or may be used two or more kinds.

When the silicone oil includes a non-reactive silicone oil other than the polyether-modified silicone oil in the invention, the antifouling layer can express the antifouling effect more sufficiently and the adhesion of aquatic organisms, for example, algae can be more effectively prevented over a long period of time.

In addition, when the silicone oil includes a non-reactive silicone oil other than the polyether-modified silicone oil in the invention, the silicone oil can exude more effectively to the surface of the antifouling layer so that the antifouling effect can be sustained for a longer period of time and the antifouling effect is expressed more sufficiently after removing the aquatic organisms attached.

The non-reactive silicone oil other than the polyether-modified silicone oil has a polysiloxane composed of a siloxane bond in the main chain and may have a substituent. The main chain may form a ring. The non-reactive silicone oil other than the polyether-modified silicone oil includes, for example, a straight silicone oil, a modified silicone oil (excepting for the polyether-modified silicone oil).

The substituent in the straight silicone oil is preferably a methyl group or a phenyl group.

The bonding position of the substituent in the straight silicone oil may be any appropriate bonding position. For example, the substituents may be bound to both terminals of the main chain, the substituent may be bound to one terminal of the main chain, or the substituent may be bound to a side chain.

The non-reactive silicone oil other than the polyether-modified silicone oil is preferably represented by formula (2).

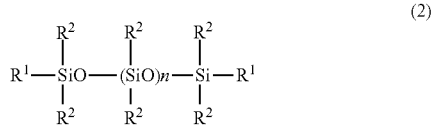

(2)

In formula (2), $R^1$'s, which may be the same or different, each represent an alkyl group having from 1 to 10 carbon atoms, an aryl group, an aralkyl group, a fluoroalkyl group, a polyether group or a hydroxyl group, $R^2$'s, which may be the same or different, each represent an alkyl group having from 1 to 10 carbon atoms, an aryl group, an aralkyl group, a polyether group or a fluoroalkyl group, and n represents an integer from 0 to 150. $R^1$ in formula (2) is preferably a methyl group, a phenyl group or a hydroxyl group. $R^2$ in formula (2) is preferably a methyl group, a phenyl group or a 4-trifluorobutyl group.

The silicone oil represented by formula (2) has a number average molecular weight of preferably from 180 to 20,000, and more preferably from 1,000 to 10,000.

The silicone oil represented by formula (2) has a viscosity of preferably from 10 centistokes to 10,000 centistokes, and more preferably from 100 centistokes to 5,000 centistokes.

Specific examples of the silicone oil represented by formula (2) include a terminal hydroxyl group-containing dimethyl silicone oil in which $R^1$ at each of both terminals or one terminal represents a hydroxyl group, a dimethyl silicone oil in which all of $R^1$ and $R^2$ each represent a methyl group, and a phenyl methyl silicone oil obtained by substituting a part of the methyl groups of any such dimethyl silicone oil with phenyl groups.

The non-reactive silicone oil other than the polyether-modified silicone oil includes, for example, KF96L, KF96, KF69, KF99, KF50, KF54, KF410, KF412, KF414, FL, KF-6104 and KF-6100 (trade names) produced by Shin-Etsu Chemical Co., Ltd; and BY16-846, SF8416, SH200, SH203, SH230, SF8419, FS1265, SH510, SH550, SH710, FZ-2110 and FZ-2203 (trade names) produced by Dow Corning Toray Co., Ltd.

The content of the non-reactive silicone oil other than the polyether-modified silicone oil with respect to 100 parts by weight of the silicone resin is preferably from 10 parts by weight to 120 parts by weight, more preferably from 15 parts by weight to 110 parts by weight, still more preferably from 20 parts by weight to 100 parts by weight, and particularly preferably from 25 parts by weight to 95 parts by weight. When the content of the non-reactive silicone oil other than the polyether-modified silicone oil with respect to 100 parts by weight of the silicone resin is set to fall within the range described above, the antifouling layer can express the antifouling effect more sufficiently, the adhesion of aquatic organisms can be more effectively prevented over a long period of time, and also the antifouling layer can express the external appearance characteristics and mechanical characteristics more sufficiently.

The antifouling layer may contain any appropriate other oil to the extent that the effect of the invention is not impaired. The other oil includes, for example, a liquid paraffin, a surfactant, a liquid hydrocarbon, a fluorinated oil, an antimicrobial agent, a wax, petrolatum, an animal fat, a fatty acid, a diatom adhesion preventing agent, an agricultural chemical, a pharmaceutical (for example, medetomidine), an enzyme activity inhibitor (for example, an alkylphenol or an alkylresorcinol) and an organism repellent. The other oil may be used only one kind or may be used two or more kinds.

When the antifouling layer contains the other oil, there are cases where the antifouling layer can express an antifouling effect more sufficiently, the adhesion of aquatic organisms can be more effectively prevented over a long period of time, and also the antifouling layer can express the external appearance characteristics and mechanical characteristics more sufficiently.

Any appropriate liquid paraffin may be adopted as the liquid paraffin to the extent that the effect of the invention is not impaired. The liquid paraffin includes, for example, P-40, P-55, P-60, P-70, P-80, P-100, P-120, P-150, P-200, P-260 and P-350 produced by MORESCO Corp. and a hydrocarbon-based liquid paraffin produced by Wako Pure Chemical Industries, Ltd.

When the antifouling layer contains the liquid paraffin, there are cases where the antifouling layer can express the antifouling effect still more sufficiently, and the adhesion of aquatic organisms can be still more effectively prevented over a long period of time.

In the case where the antifouling layer contains the liquid paraffin, the content of the liquid paraffin with respect to 100 parts by weight of the silicone resin is preferably from 0.1 part by weight to 50 parts by weight, more preferably from 0.5 parts by weight to 30 parts by weight, still more preferably from 1 part by weight to 25 parts by weight, and particularly preferably from 1 part by weight to 20 parts by weight. When the content of the liquid paraffin with respect to 100 parts by weight of the silicone resin is set to fall within the range described above, the antifouling layer can express the antifouling effect more sufficiently, and the adhesion of aquatic organisms can be more effectively prevented over a long period of time.

The surfactant includes, for example, an anionic surfactant, a nonionic surfactant, an amphoteric surfactant and a cationic surfactant.

Any appropriate anionic surfactant may be adopted as the anionic surfactant to the extent that the effect of the invention is not impaired. The anionic surfactant includes, for example, an alkylbenzenesulfonate, an alkyl or alkenyl ether sulfate, an alkyl or alkenylsulfate, an α-olefinsulfonate, an α-sulfofatty acid or α-sulfofatty acid ester salt, an alkanesulfonate, a saturated or unsaturated fatty acid salt, an alkyl or alkenyl ether carboxylate, an amino acid-type surfactant, an N-acylamino acid-type surfactant and an alkyl or alkenylphosphate ester or salts thereof. The anionic surfactant may be used only one kind or may be used two or more kinds.

Any appropriate nonionic surfactant may be adopted as the nonionic surfactant to the extent that the effect of the invention is not impaired. The nonionic surfactant includes, for example, a polyoxyalkylene alkyl or alkenyl ether, a polyoxyethylene alkylphenyl ether, a higher fatty acid alkanolamide or an alkylene oxide adduct thereof, a sucrose fatty acid ester, an alkyl glycoside, a fatty acid glycerol monoester and an alkylamine oxide. The nonionic surfactant may be used only one kind or may be used two or more kinds.

Any appropriate amphoteric surfactant may be adopted as the amphoteric surfactant to the extent that the effect of the invention is not impaired. The amphoteric surfactant includes, for example, a carboxy-type or sulfobetaine-type amphoteric surfactant. The amphoteric surfactant may be used only one kind or may be used two or more kinds.

Any appropriate cationic surfactant may be adopted as the cationic surfactant to the extent that the effect of the invention is not impaired. The cationic surfactant includes, for example, a quaternary ammonium salt. The cationic surfactant may be used only one kind or may be used two or more kinds.

Any appropriate antimicrobial agent may be adopted as the antimicrobial agent to the extent that the effect of the invention is not impaired. The antimicrobial agent include a so-called antimicrobial agent and a herbicide.

The so-called antimicrobial agent includes, for example, azoxystrobin, benalaxyl, benomyl, bitertanol, bromuconazol, captafol, captan, carbendazim, chinomethionate, chlorothalonil, chlozolinate, cyprodinil, dichlofluanid, diclofen, diclomezine, dichloran, diethofencarb, dimethomorph, diniconazole, dithianon, epoxiconazole, famoxadone, fenarimol, fenbuconazol, fenfuram, fenpiclonil, fentin, fluazinam, fludioxonil, fluoroimide, fluquinconazole, flusulfamide, flutolanil, folpet, hexachlorobenzene, hexaconazole, imibenconazole, ipconazole, iprodione, kresoxim-methyl, manzeb, maneb, mepanipyrim, mepronil, metconazole, metiram, nickel bis(dimethyl dithiocarbamate), nuarimol, oxine copper, oxophosphoric acid, pencycuron, phthalide, procymidone, propineb, quintozene, sulfur, tebuconazole, teclofthalam, tecnazene, thifluzamide, thiophenate-methyl, thiram, tolclofos-methyl, tolylfluanid, triadimefon, triadimenol, triazoxide, triforine, triticonazole, vinclozolin, zineb and ziram. In addition, the antimicrobial agent which is a natural product includes a Chinese medicine ingredient, for example, a moso bamboo extract, hinokitiol, a garlic extract and glycyrrhiza. In addition, the antimicrobial agent includes an inorganic antimicrobial agent, for example, silver, copper, zinc, tin, lead and gold. In addition, for example, zeolite, hydroxyapatite, calcium carbonate, silica gel, aluminum calcium silicate, a polysiloxane compound, zirconium phosphate, zirconium sulfate, an ion exchanger or zinc oxide may be used as a support for the inorganic antimicrobial agent, if desired. The antimicrobial agent which is a synthetic product includes, for example, 2-pyridinethiol-1-oxide, p-chloro-m-cresol, polyhexamethylene biguanide, hydrochloride, benzethonium chloride, an alkylpolyaminoethylglycine, benzisothiazolin, 5-chloro-2-methyl-4-isothiazolin-3-one, 1,2-benzisothiazolin-3-one and 2,2'-dithiobis(pyridine-1-oxide).

The herbicide includes, for example, bensulfuron-methyl, pyrazosulfuron-ethyl, imazosulfuron, cyclosulfamuron, ethoxysulfuron, flucetosulfuron, azimsulfuron, primisulfuron, prosulfuron, rimsulfuron, halosulfuron-methyl, nicosulfuron, thifensulfuron-methyl, tritosulfuron, foramsulfuron, amidosulfuron, chlorsulfuron, iodosulfuron, metsulfuron-methyl, sulfosulfuron, flazasulfuron, chlorimuron-ethyl, triflusulfuron-methyl, oxasulfuron, sulfometuron-methyl, trifloxysulfuron sodium, flupyrsulfuron-ethyl-sodium, imazamox, imazethapyr, imazaquin, imazapyr, imazapic, flucarbazone-sodium, propoxycarbazone-sodium, bispyribac-sodium, pyriftalid, pyriminobac-methyl, pyrimisulfan, pyrithiobac-sodium, flumetsulam, penoxsulam, metosulam, metazosulfuron, propyrisulfuron, bentazon, atrazine, simazine, dimethametryn, pyridate, pyridafol, terbuthylazine, terbutryn, bromoxynil, ioxynil, metribuzin, lenacil, bromacil, desmedipham, phenmedipham, metamitron, simetryn, prometryn, diuron, isouron, linuron, siduron, chlorotoluron, benzofenap, pyrazolate, pyrazoxyfen, benzobicyclon, isoxaflutole, tefuryltrione, tembotrione, isoxachlortole, mesotrione, sulcotrione, benzoylhexadione, pretilachlor, butachlor, cafenstrole, fentrazamide, mefenacet, etobenzanid, thenylchlor, flufenacet, indanofan, anilofos, metolachlor, metazachlor, alachlor, propachlor, piperophos, dimethenamid, acetochlor, napropamid, thiobencarb, molinate, benfuresate, pyributicarb, ethofumesate, esprocarb, prosulfocarb, dalapon, butyrate, pentoxazone, pyraclonil, oxadiazon, oxadiargyl, pyrazil, oxyfluorfen, acifluorfen, bifenox, pyraflufen-ethyl, fluazolate, fluthiacet-methyl, butafenacil, benzfendizone, carfentrazon-ethyl, sulfentrazone, flumioxazin, aclonifen, flumiclorac, prohexadione, sethoxydim, clethodim, tepraloxydim, alloxydim, fenoxaprop-P-ethyl, diclofop-methyl, fluazifop-P-butyl, quizalofop-P-ethyl, cyhalofop-butyl, glufosinate, glufosinate-P, bialaphos, glyphosate, glyphosate isopropylamine, sulfosate, picloram, triclopyr, clomeprop, MCPB, 2,4-D,MCPA, dicamba, quinchlorac, mecoprop, dichlorprop, diflufenican, flurtamone, picolinafen, fluridon, norflurazon, beflubutamid, flurochloridon, paraquat, diquat, butamifos, pendimethalin, trifluralin, dithiopyr, thiazopyr, amiprophos-methyl, bromobutide, cumyluron, dymron, isoxaben, dichlobenil, flupoxam, chlorthiamid, oxaziclomefone, ipfencarbazone, fenoxasulfone, SW-065, pelargonic acid, clomazone, and salts thereof.

The antifouling layer may contain any other appropriate additive to the extent that the effect of the invention is not impaired. An example of the other additive is an ultraviolet absorbing agent as a weathering agent. Specific examples of the ultraviolet absorbing agent include TINUVIN571, TINUVIN460, TINUVIN213, TINUVIN234, TINUVIN329 and TINUVIN326 (trade names) produced by BASF. The addition amount of the ultraviolet absorbing agent is preferably 0.5 parts by weight or more and less than 10 parts by weight with respect to 100 parts by weight of the silicone resin. When the addition amount of the ultraviolet absorbing agent with respect to the silicone resin is set to fall within the range described above, the effect as the weathering agent may be sufficiently expressed without inhibiting the formation of the antifouling layer. In addition, the other additive includes a light stabilizer. Specific examples of the light stabilizer include TINUVIN123, TINUVIN292 and TINUVIN5100 (trade names) produced by BASF. The addition amount of the light stabilizer is preferably 0.5 parts by weight or more and less than 10 parts by weight with respect to 100 parts by weight of the silicone resin. When the addition amount of the light stabilizer with respect to the silicone resin is set to fall within the range described above, the effect as the light stabilizer may be sufficiently expressed without inhibiting the formation of the antifouling layer.

A filler or the like can be added to the antifouling layer in order to increase strength. The filler includes, for example, silica particle and diatomaceous earth. In addition, as the filler, particle having a hydrophobically treated surface is preferred in view of dispersibility. The surface treatment method includes a method of surface treatment with dimethylpolysiloxane, dimethyldichlorosilane, hexamethyldisilazane, cyclic dimethylsiloxane or the like. The size of the particle having the hydrophobically treated surface is preferably from 5 nm to 300 nm in terms of average particle diameter. When the size of the particle having the hydrophobically treated surface is set to fall within the range described above, a sufficient strength may be imparted to the antifouling layer, and also the particles may be uniformly dispersed in the antifouling layer so that cracks may be hardly generated when applied an impact on the antifouling layer. In addition, the adhesion between the antifouling layer and the base material layer may also be increased. The addition amount of the particle having hydrophobically treated surface is preferably from 0.1% by weight to 10% by weight with respect to the silicone resin. When the addition amount of the particle having hydrophobically treated surface is set to fall within the range described above, a sufficient strength may be imparted to the antifouling layer, and also the material added to the antifouling layer may be uniformly dispersed so that coating may be precisely performed in the coating on the base material layer.

The particle having hydrophobically treated surface includes, for example, hydrophobic fumed silica produced by Nippon Aerosil Co., Ltd., and specific examples thereof include an AEROSIL (registered trademark) RX series (RX50, RX200, RX300 and the like) (trade names), an AEROSIL (registered trademark) RY series (RY50, RY200, RY200S and the like), an AEROSIL (registered trademark) NY50 series, an AEROSIL (registered trademark) NAX series and an AEROSIL (registered trademark) R series produced by Nippon Aerosil Co., Ltd.

Any appropriate thickness may be adopted as the thickness of the antifouling layer depending, for example, on the applications and use environment of the pressure-sensitive adhesive tape for preventing adhesion of aquatic organisms of the invention. The thickness of the antifouling layer is preferably from 5 µm to 500 µm. When the thickness of the antifouling layer falls within the range described above, the antifouling layer effectively expresses its antifouling effect for a sufficiently long period of time, has excellent handleability, has reduced unevenness at a joint portion of the tape, and is hardly fouled. When the thickness of the antifouling layer is less than 5 µm, the layer is liable to be impractical because the time period for which the antifouling layer effectively expresses its antifouling effect is reduced. When the thickness of the antifouling layer is more than 500 µm, since the pressure-sensitive adhesive tape for preventing adhesion of aquatic organisms of the invention is thick and heavy, its handleability may deteriorate, unevenness at a joint portion of the tape enlarges, and the dirt is liable to adhere.

Any appropriate pressure-sensitive adhesive layer may be adopted as the pressure-sensitive adhesive layer to the extent that the effect of the invention is not impaired. A material for the pressure-sensitive adhesive layer includes, for example, an acrylic resin-based pressure-sensitive adhesive, an epoxy resin-based pressure-sensitive adhesive, an amino resin-based pressure-sensitive adhesive, a vinyl resin-based (e.g., vinyl acetate-based polymer) pressure-sensitive adhesive, a curable acrylic resin-based pressure-sensitive adhesive and a silicone resin-based pressure-sensitive adhesive. The material for the pressure-sensitive adhesive layer may be used only one kind or may be used two or more kinds.

The pressure-sensitive adhesive layer has a 180° peel adhesive strength of preferably 30 N/20 mm or less, more preferably 20 N/20 mm or less, and still more preferably 15 N/20 mm or less at 23° C. and at a tensile speed of 300 mm/min. When the 180° peel adhesive strength of the pressure-sensitive adhesive layer at 23° C. and at a tensile speed of 300 mm/min is set to fall within the range described above, the pressure-sensitive adhesive tape for preventing adhesion of aquatic organisms of the invention can be easily peeled from an adherend. In the case where the 180° peel adhesive strength of the pressure-sensitive adhesive layer at 23° C. and at a tensile speed of 300 mm/min exceeds 30 N/20 mm, it is difficult to peel the pressure-sensitive adhesive tape for preventing adhesion of aquatic organisms of the invention which has already been used from an adherend, and hence working efficiency is liable to remarkably deteriorate. The lower limit of the 180° peel adhesive strength of the pressure-sensitive adhesive layer at 23° C. and at a tensile speed of 300 mm/min is preferably 3 N/20 mm or more from the viewpoint that the sufficient pressure-sensitive adhesive strength can be maintained.

When the pressure-sensitive adhesive layer is brought into contact with seawater, the compressive elastic modulus of a portion of the pressure-sensitive adhesive layer brought into contact with seawater is preferably 1.1 times or more, more preferably 1.2 times or more, still more preferably 1.5 times or more as large as the compressive elastic modulus of the pressure-sensitive adhesive layer before the contact with seawater. When the pressure-sensitive adhesive layer is brought into contact with seawater, the compressive elastic modulus of the portion of the pressure-sensitive adhesive layer brought into contact with seawater is 1.1 times or more as large as the compressive elastic modulus of the pressure-sensitive adhesive layer before the contact with seawater, the layer can also express good adhesion in water. When the pressure-sensitive adhesive layer is brought into contact with seawater, the upper limit of the compressive elastic modulus of the portion of the pressure-sensitive adhesive layer brought into contact with seawater is preferably 100 times or less as large as the compressive elastic modulus of the pressure-sensitive adhesive layer before the contact with seawater from the viewpoint of handleability. The term "seawater" as used herein means commercially available simulated seawater (artificial seawater).

Any appropriate thickness may be adopted as the thickness of the pressure-sensitive adhesive layer depending, for example, on the applications and use environment of the pressure-sensitive adhesive tape for preventing adhesion of aquatic organisms of the invention. The thickness of the pressure-sensitive adhesive layer is preferably 10 µm or more. When the thickness of the pressure-sensitive adhesive layer is less than 10 µm, the layer cannot sufficiently follow the shape of an adherend, its adhesion area reduces, and thus the layer is likely to be unable to express a sufficient pressure-sensitive adhesive strength. The upper limit of the thickness of the pressure-sensitive adhesive layer is preferably 100 µm or less from the viewpoint of handleability.

The pressure-sensitive adhesive tape for preventing adhesion of aquatic organisms of the invention may be produced by any appropriate method. The method includes, for example, a method involving bonding the separately prepared base material layer and pressure-sensitive adhesive layer to each other and then applying an antifouling layer formation material onto the base material layer to form the antifouling layer, a method involving applying a pressure-sensitive adhesive layer formation material onto one surface of the base material layer to form the pressure-sensitive adhesive layer and applying the antifouling layer formation material onto the other surface of the base material layer to form the antifouling layer, and a method involving coextruding a base material layer formation material and a pressure-sensitive adhesive layer formation material to form a laminate of the base material layer and the pressure-sensitive adhesive layer and then applying the antifouling layer formation material onto the base material layer to form the antifouling layer.

A method of applying the antifouling layer formation material onto the base material layer includes, for example, a spray, brush application, a roller, a curtain flow, a roll, dipping and a coater. The antifouling layer can be formed by applying the antifouling layer formation material onto the base material layer according to any such method and drying the material, for example, at a temperature ranging from room temperature to 250° C. (preferably a temperature ranging from room temperature to 180° C.). In particular, according to one preferred embodiment of the pressure-sensitive adhesive tape for preventing adhesion of aquatic organisms of the invention, the antifouling layer formation material is applied onto the base material layer by using a precision coater, for example, a comma coater.

EXAMPLE

The invention will be described specifically with reference to the examples, but the invention should not be construed as being limited thereto.
<Adhesion Test>
The pressure-sensitive adhesive tape to be evaluated was cut into a side of 2 cm×6 cm, cuts were made in the antifouling layer using a cutter, the tape was stretched in the longitudinal direction, and whether the antifouling layer was peeled off from the base material layer or not was evaluated.

The evaluation was performed according to the criteria shown below.
○: The antifouling layer was not peeled off from the base material layer.
×: The antifouling layer was peeled off from the base material layer.
<Number of Increase in Manufacturing Process of the Pressure-Sensitive Adhesive Tape>
The degree of increase in the manufacturing process from the number of processes in Example 1 was evaluated.
<Flexibility>
The flexibility of the pressure-sensitive adhesive tape to be evaluated was evaluated by means of elastic energy (mJ). The elastic energy was measured using a tensile tester (AUTOGRAPH AGS-X produced by Shimadzu Corp.) in accordance with JIS 7161, JIS 7162 and JIS 7127. A smaller value indicates the greater flexibility.
<Evaluation of Heat Resistance>
After drying and curing (conditions: 150° C.×2 min) of the antifouling layer, the state of the pressure-sensitive adhesive tape to be evaluated was visually evaluated. In addition, as to the pressure-sensitive adhesive tape to be evaluated, the breaking strength decrease ratio (%) between before and after the curing was measured using a tensile tester (AUTOGRAPH AGS-X produced by Shimadzu Corp.) in accordance with JIS 7161, JIS 7162 and JIS 7127.
<Measurement of Antifouling Property>
All pressure-sensitive adhesive tapes to be evaluated were each cut into a size of 10 cm in width×15 cm in height and bonded onto a vinyl chloride plate having substantially the same size. All of those plates (samples) were each further fixed onto a vinyl chloride plate of 23 cm in height×42 cm in width. The units were placed 2 m below sea level at a float bridge of a yacht harbor near Gamagori city, Aichi prefecture. The units were allowed to stand for 126 days and then visually evaluated. The evaluation criteria were as described below.

○: There is no adhesion of animal-based organisms and there is no adhesion of algae.
Δ: There is no adhesion of animal-based organisms but there is adhesion of algae.
×: There is adhesion of animal-based organisms and also there is the adhesion of algae.
—: The antifouling layer was peeled off from the base material layer.
<Measurement of 180° Peel Adhesive Strength>
The adhesive in the pressure-sensitive adhesive layer was transferred to a polyester film (trade name: S-10 produced by Toray Industries, Inc., thickness: 38 μm) by using a hand roller to produce a pressure-sensitive adhesive sheet with a base material. The sheet was cut to a test piece size of 80 mm×20 mm. As an adherend, a plastic FRP plate of 30 mm×100 mm×2 mm (thickness) reinforced by adding a glass fiber cloth to an epoxy resin was used. The test piece was bonded to the adherend by reciprocating a 2-kg roller one round and allowed to stand at 23° C. for 30 minutes and then, the resulting test piece was measured for its initial 180° peel adhesive strength. The tensile speed was 300 mm/min.

Example 1

(Pressure-Sensitive Adhesive Layer)
Into a reaction vessel equipped with a cooling tube, a nitrogen inlet tube, a thermometer and a stirrer were put 90 parts by weight of 2-ethylhexyl acrylate (2EHA produced by Toagosei Co., Ltd.), 10 parts by weight of acrylic acid (AA) and 5 parts by weight of acryl oligomer (ODM) as (meth) acrylic monomers, and 0.1 part by weight of 2,2-dimethoxy-1,2-diphenylethan-1-one (trade name: IRGACURE 651 produced by BASF) as a photopolymerization initiator to disperse. While the dispersion was stirred, UV light was applied from an upper portion under nitrogen stream to convert a part of the monomers into a polymer, thereby adjusting the viscosity of the dispersion so that the dispersion could be applied. Thus, a (meth)acrylic monomer mixture was obtained. To the (meth)acrylic monomer mixture was added 0.08 parts by weight of 1,6-hexanediol diacrylate (HDDA) as a crosslinking agent, the mixture was applied to a surface of a separator (trade name: MRF38 produced by Mitsubishi Plastics, Inc., thickness: 50 μm) by an applicator, a cover separator (trade name: MRF38 produced by Mitsubishi Plastics, Inc., thickness: 38 μm) was bonded to the mixture by a hand roller, and the resultant was irradiated with ultraviolet light from a ultraviolet lamp (BL type) (ultraviolet irradiance: 3.4 mW/cm$^2$, cumulative dose: 2,000 mJ/cm$^2$) to obtain Pressure-sensitive adhesive layer (1) having a thickness of 50 μm.
(Base Material Layer)
A polyethylene-based ionomer resin base material (Himilan 1855 (metal ion: Zn) produced by DuPont-Mitsui Polychemicals Co., Ltd., thickness: 100 μm) was used as Base material layer (1).
(Antifouling Layer)
A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:89:1 was applied onto one surface of Base material layer (1) by an applicator, and cured at 150° C. for 2 minutes to obtain Antifouling layer (1) having a thickness of 100 μm.

(Pressure-Sensitive Adhesive Tape)

Pressure-sensitive adhesive layer (1) obtained was bonded onto Base material layer (1) on the opposite side to Antifouling layer (1) to obtain Pressure-sensitive adhesive tape (1).

The construction of Pressure-sensitive adhesive tape (1) was Antifouling layer (1) (thickness: 100 μm)/Base material layer (1) (thickness: 100 μm)/Pressure-sensitive adhesive layer (1) (thickness: 50 μm).

The results are shown in Table 1.

Example 2

(Pressure-Sensitive Adhesive Layer)

Pressure-sensitive adhesive layer (2) having a thickness of 50 μm was obtained in the same manner as in Example 1.

(Base Material Layer)

Base material layer (2) having a thickness of 100 μm was obtained in the same manner as in Example 1.

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:85:5 was applied onto one surface of Base material layer (2) by an applicator, and cured at 150° C. for 2 minutes to obtain Antifouling layer (2) having a thickness of 100 μm.

(Pressure-Sensitive Adhesive Tape)

Pressure-sensitive adhesive layer (2) obtained was bonded onto Base material layer (2) on the opposite side to Antifouling layer (2) to obtain Pressure-sensitive adhesive tape (2).

The construction of Pressure-sensitive adhesive tape (2) was Antifouling layer (2) (thickness: 100 μm)/Base material layer (2) (thickness: 100 μm)/Pressure-sensitive adhesive layer (2) (thickness: 50 μm).

The results are shown in Table 1.

Example 3

(Pressure-Sensitive Adhesive Layer)

Pressure-sensitive adhesive layer (3) having a thickness of 50 μm was obtained in the same manner as in Example 1.

(Base Material Layer)

Base material layer (3) having a thickness of 100 μm was obtained in the same manner as in Example 1.

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:70:20 was applied onto one surface of Base material layer (3) by an applicator, and cured at 150° C. for 2 minutes to obtain Antifouling layer (3) having a thickness of 100 μm.

(Pressure-Sensitive Adhesive Tape)

Pressure-sensitive adhesive layer (3) obtained was bonded onto Base material layer (3) on the opposite side to Antifouling layer (3) to obtain Pressure-sensitive adhesive tape (3).

The construction of Pressure-sensitive adhesive tape (3) was Antifouling layer (3) (thickness: 100 μm)/Base material layer (3) (thickness: 100 μm)/Pressure-sensitive adhesive layer (3) (thickness: 50 μm).

The results are shown in Table 1.

Comparative Example 1

(Pressure-Sensitive Adhesive Layer)

Pressure-sensitive adhesive layer (C1) having a thickness of 50 μm was obtained in the same manner as in Example 1.

(Base Material Layer)

A polyethylene resin base material (M-6 produced by Tamapoly Co., Ltd., thickness: 100 μm) was used as Base material layer (C1).

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:89:1 was applied onto one surface of Base material layer (C1) by an applicator, and cured at 150° C. for 2 minutes to obtain Antifouling layer (C1) having a thickness of 100 μm.

(Pressure-Sensitive Adhesive Tape)

Pressure-sensitive adhesive layer (C1) obtained was bonded onto Base material layer (C1) on the opposite side to Antifouling layer (C1) to obtain Pressure-sensitive adhesive tape (C1).

The construction of Pressure-sensitive adhesive tape (C1) was Antifouling layer (C1) (thickness: 100 μm)/Base material layer (C1) (thickness: 100 μm)/Pressure-sensitive adhesive layer (C1) (thickness: 50 μm).

The results are shown in Table 1.

Comparative Example 2

(Pressure-Sensitive Adhesive Layer)

Pressure-sensitive adhesive layer (C2) having a thickness of 50 μm was obtained in the same manner as in Example 1.

(Base Material Layer)

A PVC resin base material (produced by Sanvic Inc, thickness: 100 μm) was used as Base material layer (C2).

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:89:1 was applied onto one surface of Base material layer (C2) by an applicator, and cured at 150° C. for 2 minutes to obtain Antifouling layer (C2) having a thickness of 100 μm.

(Pressure-Sensitive Adhesive Tape)

Pressure-sensitive adhesive layer (C2) obtained was bonded onto Base material layer (C2) on the opposite side to Antifouling layer (C2) to obtain Pressure-sensitive adhesive tape (C2).

The construction of Pressure-sensitive adhesive tape (C2) was Antifouling layer (C2) (thickness: 100 μm)/Base material layer (C2) (thickness: 100 μm)/Pressure-sensitive adhesive layer (C2) (thickness: 50 μm).

The results are shown in Table 1.

Comparative Example 3

(Pressure-Sensitive Adhesive Layer)

Pressure-sensitive adhesive layer (C3) having a thickness of 50 μm was obtained in the same manner as in Example 1.

(Base Material Layer)

A polyethylene resin base material (M-6 produced by Tamapoly Co., Ltd., thickness: 100 μm) was used as Base material layer (C3).

(Corona Discharge Treatment)

One surface of Base material layer (C3) was subjected to corona discharge treatment by using a corona discharge treatment apparatus (Corona Treater SST Type Model P505, gap between corona treatment rolls: 1 mm, corona treatment speed: 1 m/min, corona output: 0.45 KW)

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:89:1 was applied onto the corona treated surface of Base material layer (C3) by an applicator, and cured at 150° C. for 2 minutes to obtain Antifouling layer (C3) having a thickness of 100 μm.

(Pressure-Sensitive Adhesive Tape)

Pressure-sensitive adhesive layer (C3) obtained was bonded onto Base material layer (C3) on the opposite side to Antifouling layer (C3) to obtain Pressure-sensitive adhesive tape (C3).

The construction of Pressure-sensitive adhesive tape (C3) was Antifouling layer (C3) (thickness: 100 μm)/Base material layer (C3) (thickness: 100 μm)/Pressure-sensitive adhesive layer (C3) (thickness: 50 μm).

The results are shown in Table 1.

Comparative Example 4

(Pressure-Sensitive Adhesive Layer)

Pressure-sensitive adhesive layer (C4) having a thickness of 50 μm was obtained in the same manner as in Example 1.

(Base Material Layer)

A PVC resin base material (produced by Sanvic Inc, thickness: 100 μm) was used as Base material layer (C4).

(Primer Treatment)

A mixed solution obtained by mixing a polyethylene-based ionomer resin emulsion solution (SA100 produced by Mitsui Chemicals, Inc.), colloidal silica (Adelite AT-50 produced by ADEKA Corp.) and a surfactant (Surfynol 420 produced by Nissin Chemical Industry Co., Ltd.) in a weight ratio of 100:100:0.5 was applied onto one surface of Base material layer (C4) by a wire bar #6 and dried at 60° C. for one minute to be subjected to a primer treatment.

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:89:1 was applied onto the primer treated surface of Base material layer (C4) by an applicator, and cured at 150° C. for 2 minutes to obtain Antifouling layer (C4) having a thickness of 100 μm.

(Pressure-Sensitive Adhesive Tape)

Pressure-sensitive adhesive layer (C4) obtained was bonded onto Base material layer (C4) on the opposite side to Antifouling layer (C4) to obtain Pressure-sensitive adhesive tape (C4).

The construction of Pressure-sensitive adhesive tape (C4) was Antifouling layer (C4) (thickness: 100 μm)/Base material layer (C4) (thickness: 100 μm)/Pressure-sensitive adhesive layer (C4) (thickness: 50 μm).

The results are shown in Table 1.

Comparative Example 5

(Pressure-Sensitive Adhesive Layer)

Pressure-sensitive adhesive layer (C5) having a thickness of 50 μm was obtained in the same manner as in Example 1.

(Base Material Layer)

A PVC resin base material (produced by Sanvic Inc, thickness: 100 μm) was used as Base material layer (C5).

(Primer Treatment)

A titanium oligomer-based solution (Orgatix PC0620 produced by Matsumoto Fine Chemical Co., Ltd.) was applied onto one surface of Base material layer (C5) by a wire bar #6 and dried at 100° C. for one minute to be subjected to a primer treatment.

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:89:1 was applied onto the primer treated surface of Base material layer (C5) by an applicator, and cured at 150° C. for 2 minutes to obtain Antifouling layer (C5) having a thickness of 100 μm.

(Pressure-Sensitive Adhesive Tape)

Pressure-sensitive adhesive layer (C5) obtained was bonded onto Base material layer (C5) on the opposite side to Antifouling layer (C5) to obtain Pressure-sensitive adhesive tape (C5).

The construction of Pressure-sensitive adhesive tape (C5) was Antifouling layer (C5) (thickness: 100 μm)/Base material layer (C5) (thickness: 100 μm)/Pressure-sensitive adhesive layer (C5) (thickness: 50 μm).

The results are shown in Table 1.

Comparative Example 6

(Pressure-Sensitive Adhesive Layer)

Pressure-sensitive adhesive layer (C6) was obtained in the same manner as in Example 1.

(Base Material Layer)

A polyca-based polyurethane resin base material (Esuma URS PXII produced by Nihon Matai Co., Ltd., thickness of 100 μm) was used as Base material layer (C6).

(Antifouling Layer)

A mixed solution obtained by mixing an addition type silicone resin (KE-1950 produced by Shin-Etsu Chemical Co., Ltd.), dimethyl silicone oil (KF96-100Cs produced by Shin-Etsu Chemical Co., Ltd.) and a polyether-modified silicone oil (KF6017 produced by Shin-Etsu Chemical Co., Ltd.) in a weight ratio of 100:85:5 was applied onto one surface of Base material layer (C6) by an applicator, and cured at 150° C. for 2 minutes to obtain Antifouling layer (C6) having a thickness of 100 μm.

(Pressure-Sensitive Adhesive Tape)

Pressure-sensitive adhesive layer (C6) obtained was bonded onto Base material layer (C6) on the opposite side to Antifouling layer (C6) to obtain Pressure-sensitive adhesive tape (C6).

The construction of Pressure-sensitive adhesive tape (C6) was Antifouling layer (C6) (thickness: 100 μm)/Base material layer (C6) (thickness: 100 μm)/Pressure-sensitive adhesive layer (C6) (thickness: 50 μm).

The results are shown in Table 1.

TABLE 1

|  | Adhesion | Number of Increase in Manufacturing Process | Flexibility: Elastic Energy (mJ) | Heat Resistance: Visual Observation | Heat Resistance: Breaking Strength Decrease Ratio | Antifouling Property After Immersion for 126 Days | 180° Peel Adhesive Strength (N/20 mm) |
|---|---|---|---|---|---|---|---|
| Example 1 | ○ | 0 | 3.0 | No change | Less than 10% | Δ | 9.5 |
| Example 2 | ○ | 0 | 3.0 | No change | Less than 10% | ○ | 9.2 |
| Example 3 | ○ | 0 | 3.0 | No change | Less than 10% | ○ | 9.3 |
| Comparative Example 1 | × | 0 | 3.8 | Curling | 50% or more | — | 10 |
| Comparative Example 2 | × | 0 | 2.4 | No change | Less than 10% | — | 8.6 |
| Comparative Example 3 | ○ | 1 | 3.8 | Curling | 50% or more | Δ | 9.8 |
| Comparative Example 4 | ○ | 2 | 2.4 | No change | Less than 10% | Δ | 8.4 |
| Comparative Example 5 | ○ | 1 | 2.4 | No change | Less than 10% | Δ | 8.5 |
| Comparative Example 6 | × | 0 | 8.0 | No change | Less than 10% | — | 11.3 |

INDUSTRIAL APPLICABILITY

The pressure-sensitive adhesive tape for preventing adhesion of aquatic organisms of the invention can be suitably utilized in an underwater structure (for example, a ship, a buoy, a harbor facility, a maritime oil field facility, a waterway for power plant cooling water, a waterway for factory cooling water or a water floating passage) because the tape can prevent aquatic organisms from adhering to the structure to proliferate.

DESCRIPTION OF REFERENCE NUMERALS AND SIGNS

1: release film
2: antifouling layer
3: base material layer
4: pressure-sensitive adhesive layer
100: pressure-sensitive adhesive tape for preventing adhesion of aquatic organisms

The invention claimed is:

1. A pressure-sensitive adhesive tape for preventing adhesion of aquatic organisms comprising an antifouling layer, a base material layer and a pressure-sensitive adhesive layer in this order, wherein the base material layer contains 50% by weight to 100% by weight of an ionomer resin, and wherein the antifouling layer contains an addition-type silicone resin and a polyether-modified silicone oil, wherein the polyether modified silicone oil is represented by formula (1):

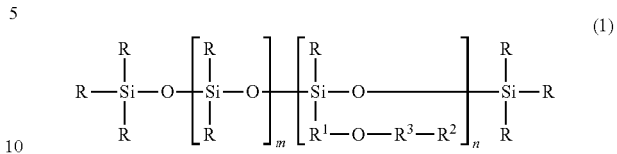

wherein, in the formula (1), R each independently represents an alkyl group having from 1 to 3 carbon atoms, $R^1$ represents an alkylene group having from 1 to 4 carbon atoms, $R^2$ represents a hydrogen atom or an alkyl group having from 1 to 15 carbon atoms, $R^3$ is a polyoxyalkylene group represented by $-(C_2H_4O)_a-(C_3H_6O)_b-$, a is from 1 to 50, b is from 0 to 30, m is 1 to 7,000, and n is from 1 to 50.

2. The pressure-sensitive adhesive tape for preventing adhesion of aquatic organisms as claimed in claim 1, wherein the pressure-sensitive adhesive layer has a 180° peel adhesive strength of 30 N/20 mm or less at 23° C. and at a tensile speed of 300 mm/min.

3. The pressure-sensitive adhesive tape for preventing adhesion of aquatic organisms as claimed in claim 1, wherein the antifouling layer further contains a non-reactive silicone oil other than the polyether-modified silicone oil.

4. The pressure-sensitive adhesive tape for preventing adhesion of aquatic organisms as claimed in claim 3, wherein the non-reactive silicone oil other than the polyether-modified silicone oil is represented by formula (2):

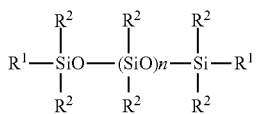

(2)

wherein, in the formula (2), $R^1$'s, which may be the same or different, each represent an alkyl group having from 1 to 10 carbon atoms, an aryl group, an aralkyl group, a fluoroalkyl group, a polyether group or a hydroxyl group, $R^2$'s, which may be the same or different, each represent an alkyl group having from 1 to 10 carbon atoms, an aryl group, an aralkyl group, a polyether group or a fluoroalkyl group, and n represents an integer from 0 to 150.

5. The pressure-sensitive adhesive tape for preventing adhesion of aquatic organisms as claimed in claim 4, wherein the alkyl group having from 1 to 10 carbon atoms representing $R^1$ in formula (2) is a methyl group, the aryl group representing $R^1$ in formula (2) is a phenyl group, or $R^1$ in formula (2) is the hydroxyl group.

6. The pressure-sensitive adhesive tape for preventing adhesion of aquatic organisms as claimed in claim 4, wherein the alkyl group having from 1 to 10 carbon atoms representing $R^2$ in formula (2) is a methyl group, the aryl group representing $R^2$ in formula (2) is a phenyl group, or the fluoroalkyl group representing $R^2$ in formula (2) is a 4-trifluorobutyl group.

7. The pressure-sensitive adhesive tape for preventing adhesion of aquatic organisms as claimed in claim 1, wherein a content of the polyether-modified silicone oil with respect to 100 parts by weight of the silicone resin is from 0.01 part by weight to 50 parts by weight.

8. The pressure-sensitive adhesive tape for preventing adhesion of aquatic organisms as claimed in claim 3, wherein a content of the non-reactive silicone oil other than the polyether-modified silicone oil with respect to 100 parts by weight of the silicone resin is from 10 parts by weight to 120 parts by weight.

* * * * *